US009607294B2

(12) United States Patent
Crist et al.

(10) Patent No.: US 9,607,294 B2
(45) Date of Patent: *Mar. 28, 2017

(54) DUAL VALIDATOR SELF-SERVICE KIOSK

(71) Applicant: Bank of America Corporation, Charlotte, NC (US)

(72) Inventors: Kristy M. Crist, Charlotte, NC (US); Terrelle Carswell, Charlotte, NC (US); Eric McConnell, Cornelius, NC (US); Rahul Puri, Charlotte, NC (US); Devin D. Rhodes, Lexington, KY (US); James D. Goodwin, Kansas City, MO (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,636

(22) Filed: Jan. 4, 2016

(65) Prior Publication Data

US 2016/0117894 A1 Apr. 28, 2016

Related U.S. Application Data

(63) Continuation of application No. 14/612,462, filed on Feb. 3, 2015, now Pat. No. 9,245,423, which is a
(Continued)

(51) Int. Cl.
*G07F 7/04* (2006.01)
*G06Q 20/10* (2012.01)
(Continued)

(52) U.S. Cl.
CPC ......... *G06Q 20/1085* (2013.01); *G06Q 20/18* (2013.01); *G07D 7/00* (2013.01);
(Continued)

(58) Field of Classification Search
CPC .... G07F 19/203; G07F 19/206; G07F 19/209; G07D 11/00; G07D 11/0021; G07D 11/0033; G07D 11/0051; G07D 11/0054; G07D 11/006; G07D 11/0063; G07D 11/0066; G07D 11/0069; G07D 11/0072; G07D 11/0075; G06F 7/08; B65H 2301/541; B65H 2301/544; B65H 2701/1912
See application file for complete search history.

(56) References Cited

U.S. PATENT DOCUMENTS 9,245,423 B2 * 1/2016 Crist ................. G07F 19/203

* cited by examiner

Primary Examiner — Mark Beauchaine
(74) Attorney, Agent, or Firm — Weiss & Arons LLP; Michael A. Springs, Esq.

(57) ABSTRACT

Apparatus and methods are provided for a dual validator self-service kiosk ("SSK"). The SSK may include a first validator. The first validator may examine a deposit inserted into the SSK. The SSK may include a second validator. The second validator may examine a tangible item before the SSK dispenses the tangible item. The SSK may retract the tangible item if the tangible item in not collected by a customer. The second validator may examine the tangible item after being retracted by the SSK. The first validator may apply a first examination routine to the deposit. The second validator may apply a second examination routine before the SSK dispenses the tangible item. The second validator may apply a third examination routine to a tangible item retracted by the SSK.

19 Claims, 9 Drawing Sheets

Related U.S. Application Data continuation of application No. 13/890,490, filed on May 9, 2013, now Pat. No. 8,985,298.

(51) Int. Cl.
  *G07F 19/00* (2006.01)
  *G07D 11/00* (2006.01)
  *G07D 7/00* (2016.01)
  *G06Q 20/18* (2012.01)

(52) U.S. Cl.
  CPC ......... *G07D 11/00* (2013.01); *G07D 11/0042* (2013.01); *G07D 11/0078* (2013.01); *G07F 7/04* (2013.01); *G07F 19/202* (2013.01); *G07F 19/203* (2013.01); *G07F 19/206* (2013.01); *G07F 19/207* (2013.01); *G07F 19/209* (2013.01)

Fraud Record

Date: April 8, 2013
Time: 08:17:21
Location: ATM1234

| Session ID | Description | Transactions Transaction ID | Amount ID | Time/Date |
|---|---|---|---|---|
| 121314 { | Dispense | 456 | $100.00 | 08:15:26  8 APR 13 |
|  | Retraction | 109 | $40.00 | 08:16:07  8 APR 13 |

Amount Withdrawn: $60.00

Customer Account: xxxxxxx

DUAL VALIDATOR SELF-SERVICE KIOSK

CROSS REFERENCE TO RELATED APPLICATIONS

This application is a continuation of U.S. application Ser. No. 14/612,462 filed on Feb. 3, 2015, which is a continuation of U.S. application Ser. No. 13/890,490 filed on May 9, 2013, now U.S. Pat. No. 8,985,298, all of which are hereby incorporated by reference in their entireties.

FIELD OF TECHNOLOGY

Aspects of the invention relate to reducing costs associated with automated teller machine ("ATM") mis-dispense claims.

BACKGROUND

ATMs provide banking customers an ability to access bank account information, deposit funds and withdraw cash. ATMs may often obviate the need for a banking customer to consult a human clerk. Additionally, ATMs may be located in a variety of diverse locations remote from banking centers. For example, ATMs may be placed on street corners, in convenience stores, supermarkets or sports arenas.

In a typical ATM transaction, the customer may submit a request for a withdrawal of an amount of cash. The ATM may determine whether the customer has a bank account balance corresponding to, at least, a value of the requested funds. If the customer has sufficient bank account balance, the ATM may dispense the requested amount of cash.

The ATM may present the requested amount of cash to the customer. If the customer does not collect all of the dispensed cash, the ATM may be configured to retract uncollected cash. The ATM may be configured to wait for an expiration of a "time out" period before retracting cash.

An ATM customer may not retrieve all, or a portion of, dispensed cash because of an ATM malfunction. For example, the customer may submit a request for $80.00 in twenty-dollar notes and the ATM may erroneously dispense $40.00 in ten-dollar notes. The customer may not retrieve the erroneously dispensed ten-dollar notes. As a further example, the ATM may not provide sufficient time for the customer to become aware that the cash has been dispensed. The ATM may retract cash before the customer has time to collect dispensed cash.

In response to a retraction of cash by the ATM, a customer may submit a mis-dispense claim. The customer may submit the mis-dispense claim to an operator of the ATM. The customer may submit the mis-dispense claim to an entity responsible for managing a bank account of the customer.

The customer may request a credit for uncollected cash retracted by the ATM. The customer may request that because cash was retracted by the ATM, the account of the customer should not be debited. The customer may allege that none or a portion of a requested amount of cash was collected by the customer.

A wide variety of ATM locations and lack of close supervision at an ATM increases a risk that a customer may submit an unwarranted mis-dispense claim. For example, the customer may intentionally collect only a portion of dispensed cash. The customer may then submit a mis-dispense claim alleging not to have collected any of the dispensed cash. Unwarranted mis-dispense claim have become so prevalent that some ATM operators have disabled a cash retraction feature of ATMs.

It would be desirable to provide a solution that examines cash retracted by an ATM following an unsuccessful customer withdrawal. Examination of retracted cash may provide information useful in a processing of mis-dispense claims and fraud research. For example, the examination may provide details such as denomination, number of bills retracted and a transaction identifier associated with the retraction.

Additionally, a requirement to replenish a cash supply of the ATM is a cost of operating an ATM or a network of ATMs. Typically, ATMs may be refilled between bi-weekly to per day. Some ATMs in busy locations must be refilled twice a day. ATM operators may be reluctant to stock ATMs with additional cash because until the cash is dispensed from the ATM the cash is idling, increasing an opportunity cost of the cash. Restricting the amount of cash that may be withdrawn by a customer may inconvenience and irritate the customer. Armored personnel and services are typically employed to deliver cash to an ATM, further increasing the cost of replenishing the cash supply of an ATM.

An examination of cash dispensed or retracted by an ATM may indicate that a cash inventory of the ATM is not being efficiently utilized. Obtaining accurate information relating to cash dispensing or retracting may allow an ATM operator to better manage a cash inventory of an ATM or network of ATMs.

For example, an ability to examine cash prior to dispensing the cash may verify that genuine notes of the correct denomination are being dispensed from the ATM. The examination may reduce a cost of dispensing counterfeit notes, non-currency items or incorrect denominations that may have been erroneously loaded into the ATM. Detection of an erroneous loading of cash into the ATM may identify a human error or a process breakdown related to cash inventory.

Therefore, it would be desirable to obtain detail associated with cash dispensed or retracted from an ATM. It would be desirable to obtain transaction detail associated with cash dispensed or retracted from an ATM. The transaction detail may supply information used in managing cash supplied to an ATM.

Therefore, it would be desirable to provide apparatus and methods for a dual validator self-service kiosk.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 8 shows illustrative information in accordance with principles of the invention.

DETAILED DESCRIPTION OF THE INVENTION

Figure 1:
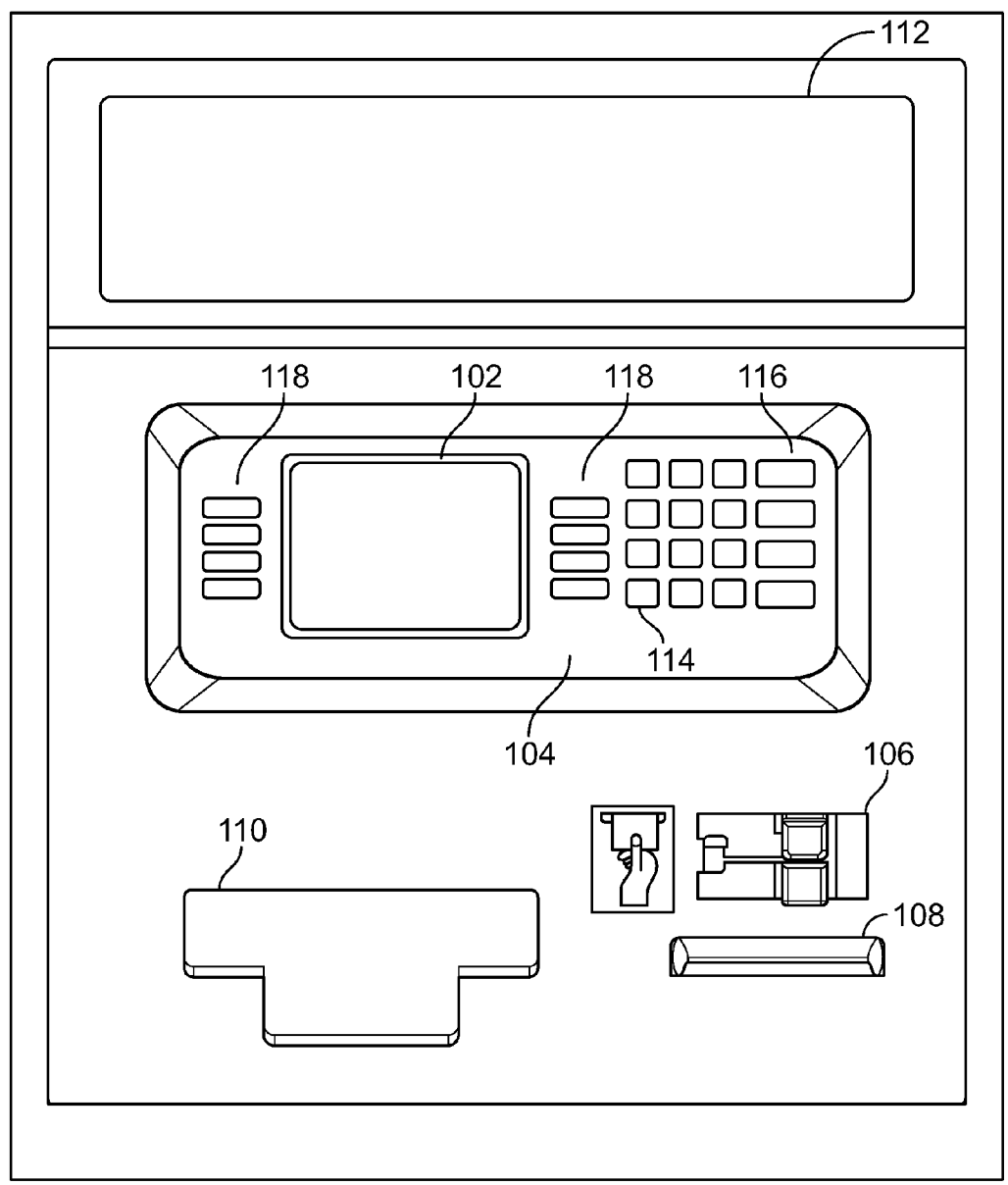
FIG. 1 shows an illustrative apparatus in accordance with principles of the invention.

Apparatus and methods are provided for a self-service kiosk that includes two validators.

The apparatus may include a self-service kiosk (hereinafter, "SSK"). The SSK may include a validator. The validator may be configured to examine a tangible item.

The tangible item may be any suitable tangible item. For example, the tangible item may include currency, bank notes, event tickets, transportation tickets, lottery tickets and airline boarding passes.

The SSK may include a dispenser. The dispenser may be configured to present the tangible item. The tangible item may be disbursed to a customer of the SSK. The customer may be a customer of an entity that operates the SSK.

The dispenser may present the tangible item to the customer in response to a request submitted by the customer. The dispenser may be configured to retract the tangible item. The dispenser may be configured to retract the tangible item into the SSK. The dispenser may be configured to retract the tangible item after the tangible item is dispensed.

The dispenser may be configured to retract the tangible item if the tangible item remains uncollected after expiration of a "time out" period. The time out period may be any suitable period of time such as one second, five seconds, ten seconds, fifteen seconds, one minute or five minutes.

The SSK may include a validator. The validator may be coupled to the dispenser. The validator may be configured to examine the tangible item. The examination may include authenticating the tangible item. The authenticating may include determining a risk that the tangible item is counterfeit. The examination may include determining a denomination of the tangible item. The examination may include counting a plurality of tangible items.

For example, if the tangible item is currency, the examination may include determining a denomination of the retracted currency. The examination may include determining a number of bills retracted by the dispenser.

The SSK may include a cassette. The cassette may be configured to hold a plurality of tangible items. The cassette may hold the plurality of tangible prior to a dispensing of the tangible item. The cassette may be coupled to a validator. The cassette may be removable from the SSK. In response to a request from a SSK user, a tangible item may be transferred from the cassette to the validator. The validator may apply a validation routine to the tangible item before the tangible item in dispensed to the SSK user. Applying the validation routine to the tangible item may include performing an examination of one or more attributes of the tangible item.

The SSK may include a purge-bin. The purge-bin may be configured to hold one or more tangible items. The one or more tangible items may be transferred to the purge-bin after being retracted into the SSK by the dispenser. The purge-bin being coupled to the validator. The validator may apply a validation routine to the tangible item before the tangible items is stored in the purge-bin. The purge-bin may be removable from the SSK.

The validator may be a first validator. The first validator may examine a tangible item prior to dispensing the tangible item. The first validator may examine the tangible item after a retracting of the tangible item.

The tangible item may be a first tangible item. The SSK may include an acceptor. The acceptor may be configured to receive a second tangible item. The second tangible item may be deposited by a customer. The acceptor may be configured to receive the second tangible item from the customer.

A first tangible item dispensed from a SSK may be one of a plurality of first tangible items. The first validator may include a counter. The counter may be configured to count each of the plurality of first tangible items. The counter may count first tangible items before they are dispensed. The counter may count first tangible items are they are retracted by the dispenser.

The first validator may include a denomination detector. The denomination detector may be configured to detect a denomination of each of the plurality of first tangible items. The first validator may include a counterfeit detector. The counterfeit detector may be configured to identify non-currency items. The non-currency items may be included among the plurality of first tangible items.

The SSK may include a second validator. The second validator may be coupled to the acceptor. The second validator may be configured to examine a second tangible item deposited by a customer into the acceptor. The second validator may be configured to provide a more rigorous examination compared to an examination of the first validator. For example, the second validator may be configured to determine whether the second tangible item is currency, a denomination of the currency and whether the currency is in an acceptable condition for deposit.

The first validator may be configured to apply a first examination routine to a tangible item. The first examination routine may be applied to the tangible item prior to dispensing a tangible item to the customer. The first validator may be configured to apply a second examination routine. The second examination routine may be applied after retracting a tangible item. Applying an examination routine may include identifying one or more characteristics or attributes of a tangible item. Applying the examination routine may include validating or authenticating the tangible item.

The second validator may be configured to apply a third examination routine. The third examination routine may be applied in response to receiving a deposit from a SSK customer.

Methods for dispensing currency at an automated teller machine ("ATM") are provided. The methods may be performed by an apparatus. The apparatus may include a non-transitory computer readable medium. The non-transitory computer readable medium may include computer readable program code embodied therein. The apparatus may include a processor. The processor may be configured to execute the computer readable program code.

The methods may include extracting a tangible item from a cash cassette. The methods may include examining the tangible item extracted from the cash cassette. The examination may include identifying the tangible item as currency. The examination may include authenticating the currency. The examination may include determining a denomination of the currency. The methods may include presenting the currency to a customer. The currency may be presented to the customer using a dispenser of the ATM.

The methods may include retracting currency after a time-out period. The methods may include after the retracting, examining the currency. An examination of the currency after a retracting may include determining a denomination of the currency.

The tangible item may be one of a plurality of tangible items. The plurality of tangible items may be stored in a cash cassette. The methods may include, when the tangible item is one of a plurality of tangible items, extracting each of the plurality of tangible items from the cash cassette. The plurality of tangible items may be extracted in response to a withdrawal request entered by a customer of an ATM. The customer may request an amount of cash.

The methods may include calculating a first value ("FV"). The FV may correspond to a value of the plurality of tangible items extracted from a cash cassette. The methods may include dispensing each of the plurality of tangible items to the customer.

Calculating the FV may include, after extracting tangible items from a cash cassette, conducting a count of each of the tangible items extracted from the cash cassette. Calculating the FV may include determining a denomination of each of the tangible items extracted from the cash cassette. If a tangible item extracted from the cash cassette is not currency, the methods may include transferring the non-currency item to a purge-bin. If a tangible item extracted from the cash cassette is not currency, the methods may include extracting a replacement for the non-currency item from the cash cassette.

The methods may include, after an expiration of a time-out period, retracting at least a portion of the plurality of tangible items. After the retracting, each tangible item included in the portion of the plurality of tangible items may be transferred to a validator. The validator may examine each of the retracted tangible items. The validator may examine each of the retracted items before storing each of the retracted items in a purge-bin. Retracted tangible items may correspond to tangible items that have not been collected by the customer prior to expiration of a time-out period.

In response to a detection of a non-currency item extracted from the cash cassette, the methods may include submitting a mis-loaded cassette claim to an entity responsible for loading the cash cassette.

The methods may include calculating a second value ("SV"). The SV may correspond to a value of tangible items retracted by the SSK. The methods may include computing a difference equal to: (FV)–(SV). The difference may correspond to a value of cash collected by the customer. The methods may include debiting an account of the customer an amount equal to the difference.

For example, the customer may request a withdrawal of $100.00. The ATM may dispense $100.00 and the customer may only collect $80.00. The uncollected $20.00 may be retracted by the ATM. A validator coupled to the dispenser may examine the retracted cash. The validator may determine that $20.00 has been retracted. Based on a difference between the amount of cash requested by the customer ($100.00) and the amount of cash retracted by the ATM ($20.00), an operator of the ATM may debit an account of the customer not more than $80.00. Based on the determination by the validator that $20.00 was retracted by the ATM, an operator of the ATM may deny a mis-dispense claim that alleges less than $80.00 was collected by the customer.

The methods may include logging one or more details associated with an examination of a tangible item. The details may include one or more attributes or results of the examination. For example, the methods may include logging a date and time of the identifying, a denomination of a replacement for a non-currency item or any suitable details.

If a tangible item does not correspond to an expected denomination, the methods may include transferring the tangible item to a purge-bin. In response to detection of the unexpected denomination, the methods may include submitting a mis-loaded cassette claim to an entity responsible for loading the cash cassette.

Methods for determining a value of cash dispensed by an automated teller machine ("ATM") are provided. The methods may include receiving a request for a withdrawal of cash from the ATM. The request may be submitted by a customer of the ATM. The customer of the ATM may be a customer of a financial entity. The customer of the ATM may hold one or more accounts at the financial entity.

The methods may include extracting cash from a cash cassette of the ATM. The extracted cash may be transferred to a validator. Prior to dispensing the cash to an ATM customer, the methods may include examining the extracted cash. Prior to dispensing the cash to an ATM user, the methods may include authenticating the extracted cash.

The extracted cash may be examined for non-currency items. As a result of a process breakdown or human error, a non-currency item may be erroneously loaded into to a cash cassette. Examining the cash prior to a dispensing of the cash to an ATM customer may prevent the non-currency item from being dispensed to the ATM user.

The methods may include identifying a non-currency item included in a first batch of cash. The first batch of cash may be extracted from a cash cassette in response to a withdrawal request submitted by an ATM customer. In response to identifying a non-currency item included in the first batch of cash, the methods may include extracting a second batch of cash from the cash cassette. The methods may include examining the second batch of cash. The examining may include verifying that the second batch of cash does not include a non-currency item. If the second batch of cash includes only cash, the second batch of cash may be dispensed to the ATM customer.

The methods may include determining a first value of the extracted cash. The methods may include dispensing the extracted cash to the ATM customer. The methods may include retracting at least a portion of the cash dispensed to the customer. Retracted cash may include cash uncollected by the ATM customer. The retracting may occur after expiration of a time-out period.

After the retracting, the uncollected cash may be transferred to a validator. The validator may examine the uncollected cash. The examination may include counting the uncollected cash. The validator may perform the counting.

The validator may be one of a plurality of validators. For example, an ATM may include a first validator for examining deposits received via an acceptor. The ATM may include a second validator for examining currency retracted by a dispenser of the ATM. The second validator may examine currency extracted from a cash cassette.

The methods may include determining a second value. The second value may correspond to a value of the uncollected and retracted cash. The methods may include debiting an account of the ATM customer an amount corresponding to a difference between the first value and the second value.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows illustrative self-service device 100. Self-service device 100 may be an ATM. Self-service device 100 may include monitor 102, keypad 104, card reader port 106, acceptor 108, item dispenser 110 and security screen 112.

Monitor 102 may exchange visual and or audio information with a customer. Keypad 104 may include alphanumeric keys 114 for the customer to enter numerical and textual data. Keypad 104 may include control keys 116. In some embodiments, control keys 116 may be used to communicate control information, such as instructions, to self-service device 100. Keypad 104 may include soft keys 118. Soft keys 118 may have functions that are dictated by programming and are presented to the customer using information that may be displayed on monitor 102.

Card reader port 106 may be the front end of any suitable card reader. The card reader may read magnetically encoded information on transaction instruments such as bank cards. In some embodiments, self-service device 100 may include a contactless chip reader, a wireless transceiver or any other suitable interface for exchanging transaction information with a transaction instrument. The transaction instrument may be a chip, an RFID tag, a smart card, a PDA, a telephone or any other suitable device.

In some embodiments, self-service device 100 may include a biometric sensor (not shown). The biometric sensor may identify a customer based on a feature, such as an anatomical feature, of the customer. For example, the biometric sensor may be configured to identify the customer based on all or part of a face, a fingerprint, an iris, a retina, a hand or any other suitable anatomical feature. The biometric sensor may identify the customer based on a behavioral feature such as a signature, a voice, a gait or any other suitable behavioral feature.

Acceptor 108 may accept any suitable documents. For example, acceptor 108 may accept envelopes, deposit forms, bills, checks or any other suitable tangible item. In some embodiments, acceptor 108 may feed into a scanner that digitizes the tangible item for image-based transaction processing.

Item dispenser 110 may dispense tangible items. For example, item dispenser 110 may dispense bills.

Security screen 112 may visually screen a surveillance device (not shown). The surveillance device may provide video information about individuals that are present near the self-service device and the conditions there.

Figure 2:
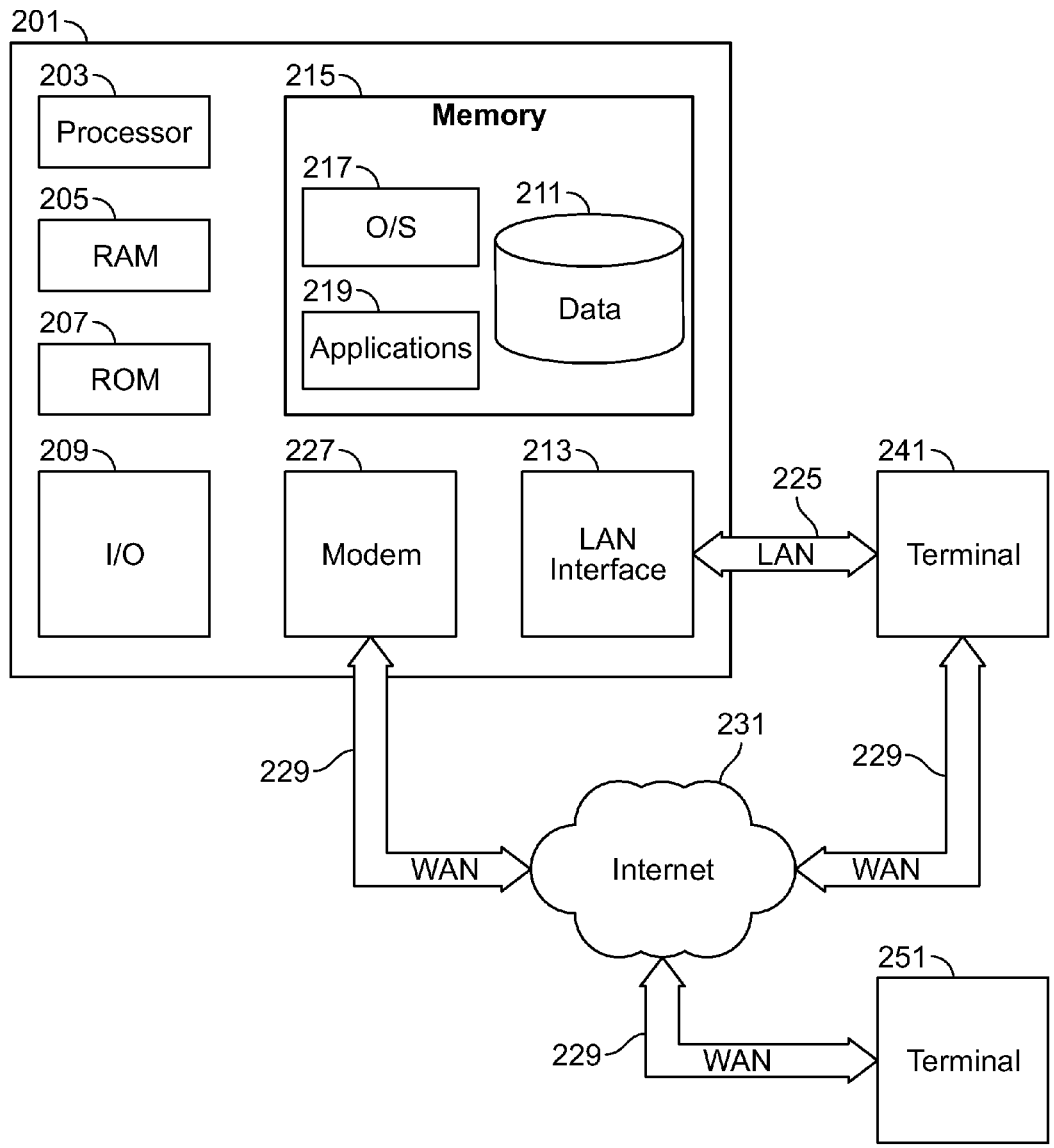
FIG. 2 shows an illustrative apparatus in accordance with principles of the invention.

FIG. 2 is a block diagram that illustrates a generic computing device 201 (alternatively referred to herein as a "server") that may be used according to an illustrative embodiment of the invention. The computer server 201 may have a processor 203 for controlling overall operation of the server and its associated components, including RAM 205, ROM 207, input/output module 209, and memory 215.

Input/output ("I/O") module 209 may include a microphone, keypad, touch screen, and/or stylus through which a user of device 201 may provide input, and may also include one or more of a speaker for providing audio output and a video display device for providing textual, audiovisual and/or graphical output. Software may be stored within memory 215 and/or storage to provide instructions to processor 203 for enabling server 201 to perform various functions. For example, memory 215 may store software used by server 201, such as an operating system 217, application programs 219, and an associated database 211. Alternatively, some or all of server 201 computer executable instructions may be embodied in hardware or firmware (not shown).

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks. When used in a LAN networking environment, computer 201 is connected to LAN 225 through a network interface or adapter 213. When used in a WAN networking environment, server 201 may include a modem 227 or other means for establishing communications over WAN 229, such as Internet 231.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219, which may be used by server 201, may include computer executable instructions for invoking user functionality related to communication, such as email, short message service (SMS), and voice input and speech recognition applications.

Computing device 201 and/or terminals 241 or 251 may also be mobile terminals including various other components, such as a battery, speaker, and antennas (not shown).

Terminal 251 and/or terminal 241 may be portable devices such as a laptop, tablets, smartphones, or any other suitable device for storing, transmitting and/or transporting relevant information.

Any information described above in connection with database 211, and any other suitable information, may be stored in memory 215.

One or more of applications 219 may include one or more algorithms that may monitor a presence of a tangible item in a dispenser, examine a tangible item, count retracted tangible items, determine a denomination of retracted tangible items, control a transfer of a tangible item between a validator and dispenser or perform any suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 3:
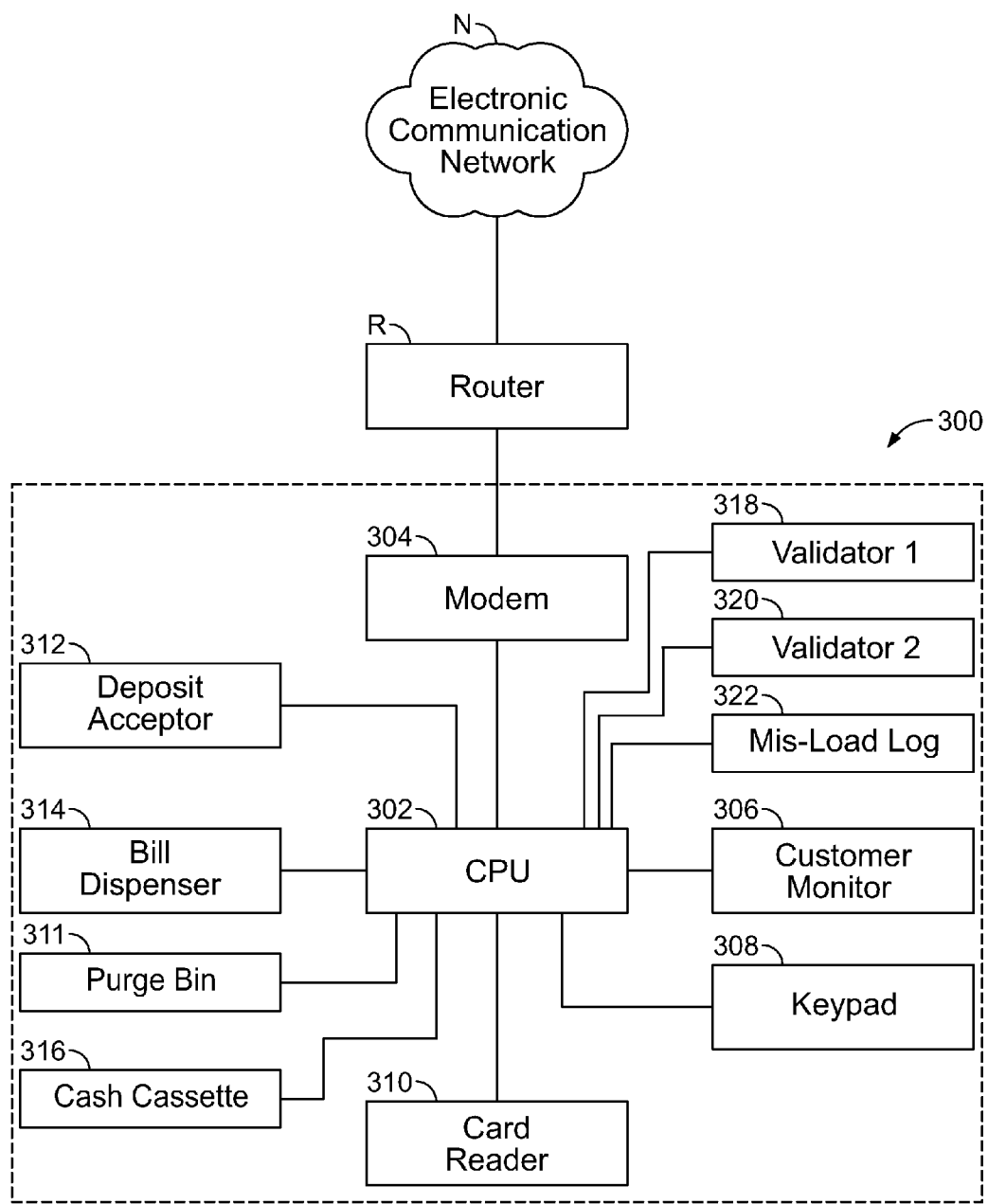
FIG. 3 shows an illustrative apparatus in accordance with principles of the invention.

FIG. 3 shows illustrative apparatus 300. Apparatus 300 may include a system for controlling a self-service kiosk such as self-service device 100 (shown in FIG. 1).

Apparatus 300 may be controlled by CPU 302. CPU 302 may include one or more features of server 201 (shown in FIG. 2). CPU 302 may exchange information with electronic communication network N via modem 304, which is in communication with router R.

CPU 302 may receive information from a customer via monitor 306, keypad 308, card reader 310 or deposit acceptor 312. Cash cassette 316 may store cash available to be presented to an ATM user.

CPU 302 may control an extraction of cash from cash cassette 316. CPU 302 may control a transfer of cash from cash cassette 316 to validator 318. Validator 318 may examine cash received from cash cassette 316. Validator 318 may apply one or more examination routines to cash received from cash cassette 316. CPU 302 may instruct validator 318 to apply the examination routines.

CPU 302 may receive information from validator 318. CPU 302 may receive a result of applying an examination routine performed by validator 318. CPU 302 may process the information received from validator 318. CPU 302 may transmit information received from validator 318 onto electronic network N via modem 304 and router R.

In response to information received from validator 318, CPU 302 may initiate a transfer of cash from validator 318 to purge-bin 311. For example, if a non-cash item is detected by validator 318, the non-cash item may be diverted to purge-bin 311. CPU 302 may record a detection of a non-cash item in mis-load log 322. Contents of mis-load log 322 may be transmitted onto network N.

CPU 302 may control a transfer of cash from validator 318 to bill dispenser 314. Bill dispenser 314 may present cash to an ATM customer. Bill dispenser 314 may retract cash that is not collected by the ATM customer. CPU 302 may transmit and/or receive information to/from bill dispenser 314. For example, CPU 302 may control a dispensing or retracting of bills using bill dispenser 314. CPU 302 may instruct bill dispenser 314 to retract any currency that remains in bill dispenser 314 after expiration of a time-out period.

CPU 302 may control a transfer of retracted cash from dispenser 314 to validator 318. CPU 318 may instruct validator 318 to apply an examination routine designed for retracted cash. In response to a result of applying the examination routine, CPU 302 may control a transfer of retracted cash from validator 318 to purge-bin 311. CPU 302 may transmit a result of the examination routine onto network N.

CPU 302 may receive request to insert a deposit. CPU 302 may instruct acceptor 312 to receive the deposit. CPU 302 may control a transfer of the deposit to validator 320. Validator 320 may apply one or more examination routines to the deposit. Based on a result of applying the examination routines, CPU 302 may determine whether to accept the deposit. Accepting the deposit may correspond to crediting an account of the depositor.

CPU 302 may instruct validator 320 to apply one or more examination routines based on a characteristic of the deposit. For example, CPU 302 may instruct validator 320 to apply a first examination routine to identify the deposit. CPU 302 may instruct validator 320 to apply a second examination routine if the deposit is a check. CPU 302 may instruct validator 320 to apply a third examination routine if the deposit is cash.

CPU 302 may control a transfer of the deposit from validator 320. For example, if CPU 302 determines that a cash deposit is of inferior quality, CPU 302 may control transfer of the deposit from validator 320 to deposit acceptor 312. The deposit may be returned to the ATM customer via acceptor 312. If CPU 302 determines that a deposit may be counterfeit, CPU 302 may control a transfer of the deposit from validator 320 to a secure storage receptacle, such as purge-bin 311.

Figure 4:
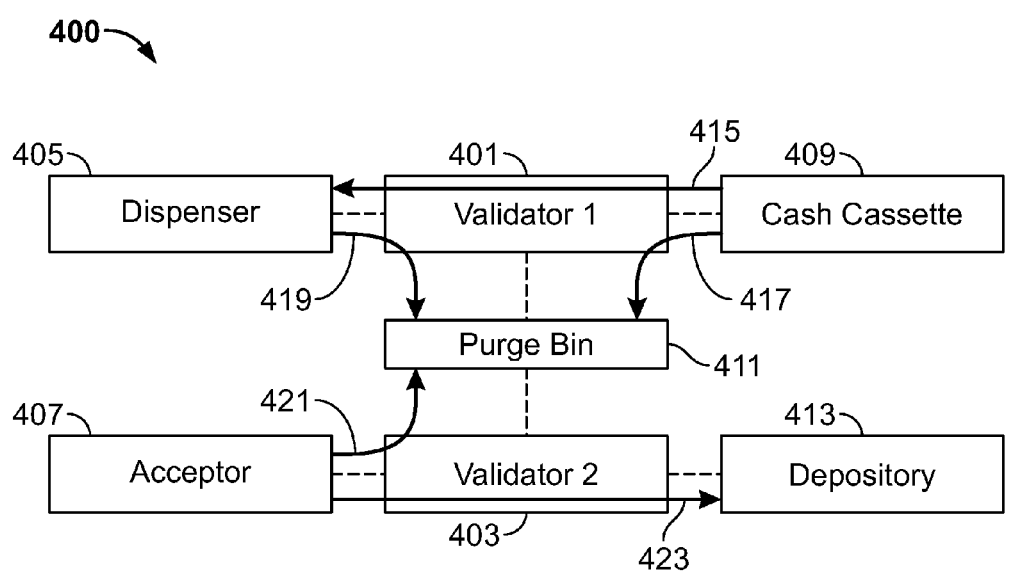
FIG. 4 shows an illustrative apparatus in accordance with principles of the invention.

FIG. 4 shows illustrative components 400. Self-service device 100 (shown in FIG. 1) or apparatus 300 (shown in FIG. 3) may include one or more features of components 400.

Components 400 include cash cassette 409. Cash cassette 409 may include one or more features of cash cassette 316 (shown in FIG. 3). Cash may be retrieved from cash cassette 409 and transferred to validator 401. Validator 401 may include one or more features of validator 318 (shown in FIG. 3).

Validator 401 may examine cash retrieved from cash cassette 409 prior to a dispensing of the retrieved cash. If validator 409 identifies an anomaly associated with the cash retrieved from cash cassette 409, the cash may be diverted to purge-bin 411. Purge-bin 411 may include one or more features of purge-bin 311 (shown in FIG. 3). Indicator 417 shows a flow of cash from cash cassette 409 through validator 401 to purge-bin 411.

Components 400 include dispenser 405. Dispenser 405 may include one or more features of dispenser 110 (shown in FIG. 1) or dispenser 314 (shown in FIG. 3). Cash examined by validator 401 may be dispensed using dispenser 405. Indicator 415 shows a flow of cash from cash cassette 409 through validator 401 to dispenser 405.

Dispenser 405 may be configured to retract uncollected cash. The uncollected cash may be transferred from dispenser 405 to validator 401. Validator 401 may examine the uncollected cash retracted by dispenser 405. Validator 401 may determine one or more characteristics of the uncollected cash. For example, validator 401 may determine a value of the uncollected cash. Validator 401 may determine a denomination of each bill included in the retracted cash.

After examination of the retracted cash by validator 401, the retracted cash may be stored in purge-bin 411. Indicator 419 shows a retraction flow from dispenser 405 through validator 401 into purge-bin 411.

Components 400 include acceptor 407. Acceptor 407 may include one or more features of acceptor 108 (shown in FIG. 1) or acceptor 312 (shown in FIG. 3). Acceptor 407 may receive tangible items for deposit. A tangible item inserted into acceptor 407 may be transferred to validator 403. Validator 403 may include one or more features of validator 320 (shown in FIG. 3). Validator 403 may apply one or more examination routines to the deposit. For example, validator 403 may determine a routing number and an account number on a deposited check. Validator 403 may attempt to identify counterfeit cash inserted into acceptor 407.

If validator 403 identifies an anomaly associated with an item inserted into acceptor 407, the item may be transferred to purge-bin 411. An anomaly may include a result of an examination routine. Indicator 421 shows an illustrative flow from acceptor 407 through validator 403 into purge-bin 411.

If validator 403 determines that the item inserted into acceptor 403 may be accepted for deposit, the item may be transferred to depository 413. Indicator 423 shows an illustrative flow of item from acceptor 407 through validator 403 into depository 413.

Figure 5:
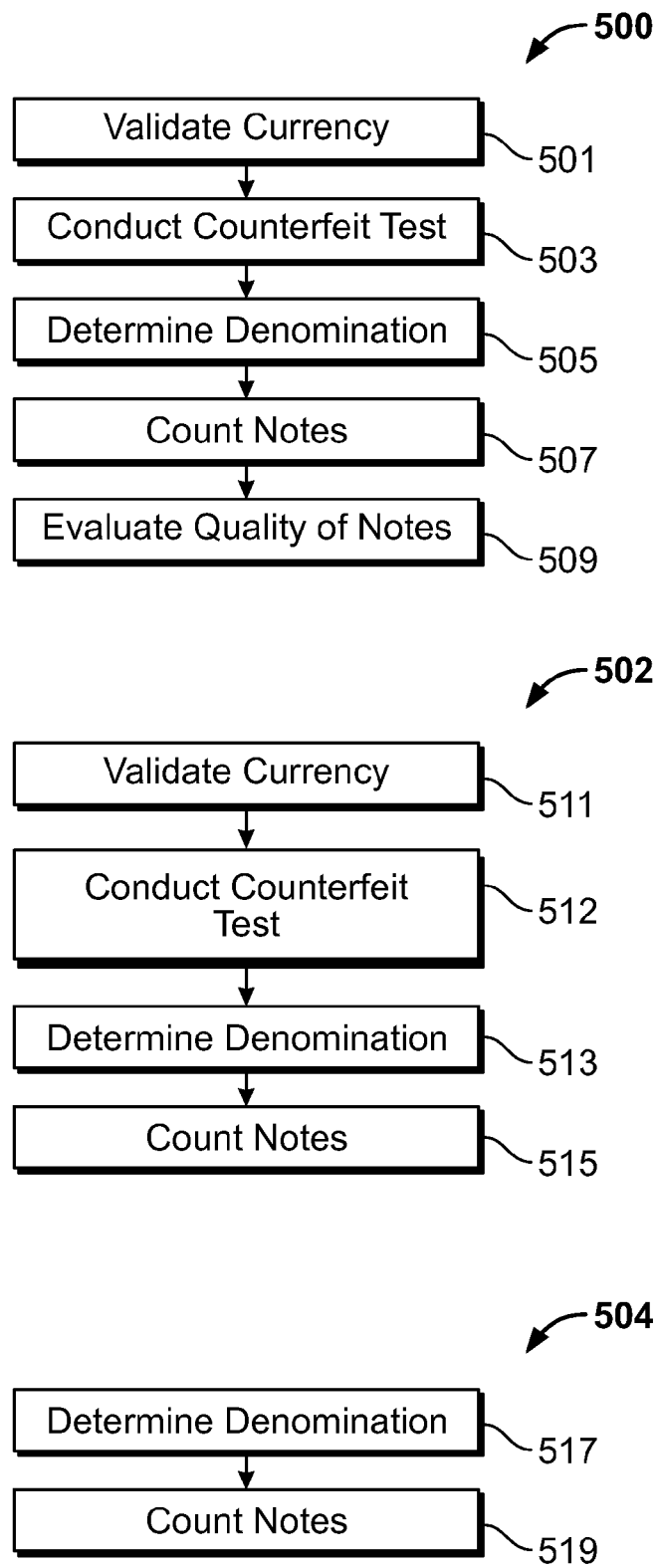
FIG. 5 shows illustrative processes in accordance with principles of the invention.

FIG. 5 shows illustrative examination routines 500, 502 and 504. For the sake of illustration, the steps of the examination routines illustrated in FIG. 5 will be described as being performed by a "system." The "system" may include one or more of the features of the apparatus that are shown in FIGS. 1-4 and/or of any other suitable device or approach. For example, examination routines 500, 502 or 504 may be applied to a tangible item by a validator, such as validators 318 and 320 (shown in FIG. 3) or 401 and 403 (shown in FIG. 4).

The "system" may be provided by an entity. The entity may be an individual, an organization or any other suitable entity.

Examination routine 500 includes five steps. At step 501, the system validates currency. The currency may be received from an acceptor, such as acceptor 108 (shown in FIG. 1), acceptor 312 (shown in FIG. 3) or acceptor 407 (shown in FIG. 4). Validating the currency may include identifying a deposited tangible item as currency.

At step 503, the system determines an authenticity of a tangible item. Determining authenticity may include attempting to identify a counterfeit or forged tangible item. The tangible item may be any suitable tangible item. Authenticity may be determined by communicating detected characteristics of a deposited item to a remote network, such as network N (shown in FIG. 3). Authenticity may be determined by comparing one or more features of a deposited item to features stored in a database such as database 211 (shown in FIG. 2).

At step 505, the system determines a denomination of the tangible item. For example, the system may determine if the tangible item is a $10 dollar-bill or a $20 dollar-bill. At step 507, the system counts two or more tangible items. For example, the system may determine how many $20 dollar-bills are received by a validator.

At step 509, the system may evaluate a quality of the tangible items. For example, if cash is deposited by a customer into a SSK, step 509 may determine whether cash is of a threshold quality. Quality may be evaluated based on discoloration of the cash discoloration or tears in the cash.

Examination routine 500 may be performed by a validator in response to receiving a tangible item from an acceptor. Tangible items received from the acceptor may be subject to a five step examination routine, such as routine 500.

Examination routine 502 includes four steps. At step 511, the system validates currency. At step 512, the system authenticates currency. At step 513, the system determines a denomination of currency. At step 515, the system counts notes.

Examination routine 502 may be performed by a validator in response to receiving a tangible item from a cash cassette, such as cash cassette 316 (shown in FIG. 3) or cash cassette 409 (shown in FIG. 4). Performing examination routine 502 prior to dispensing a tangible item may prevent items erroneously loaded into the cash cassette from being dispensed to a customer. Tangible items received from a cash cassette may be subject to a four step examination routine, such as routine 502. Examination routine 502 may be performed in less time than examination routine 500.

Examination routine 504 includes two steps. At step 517, the system determines a denomination of one or more tangible items. At step 519, the system counts two or tangible items.

Examination routine 504 may be performed by a validator in response to retracting a tangible item from a dispenser. Performing examination routine 504 prior to storing a retracted tangible item may enable the system to detect and record one or more features of the retracted items. Retracted tangible items by may be subject to a two-step examination routine, such as routine 504. Examination routine 504 may be performed in less time than examination routines 500 or 502.

Figure 6:
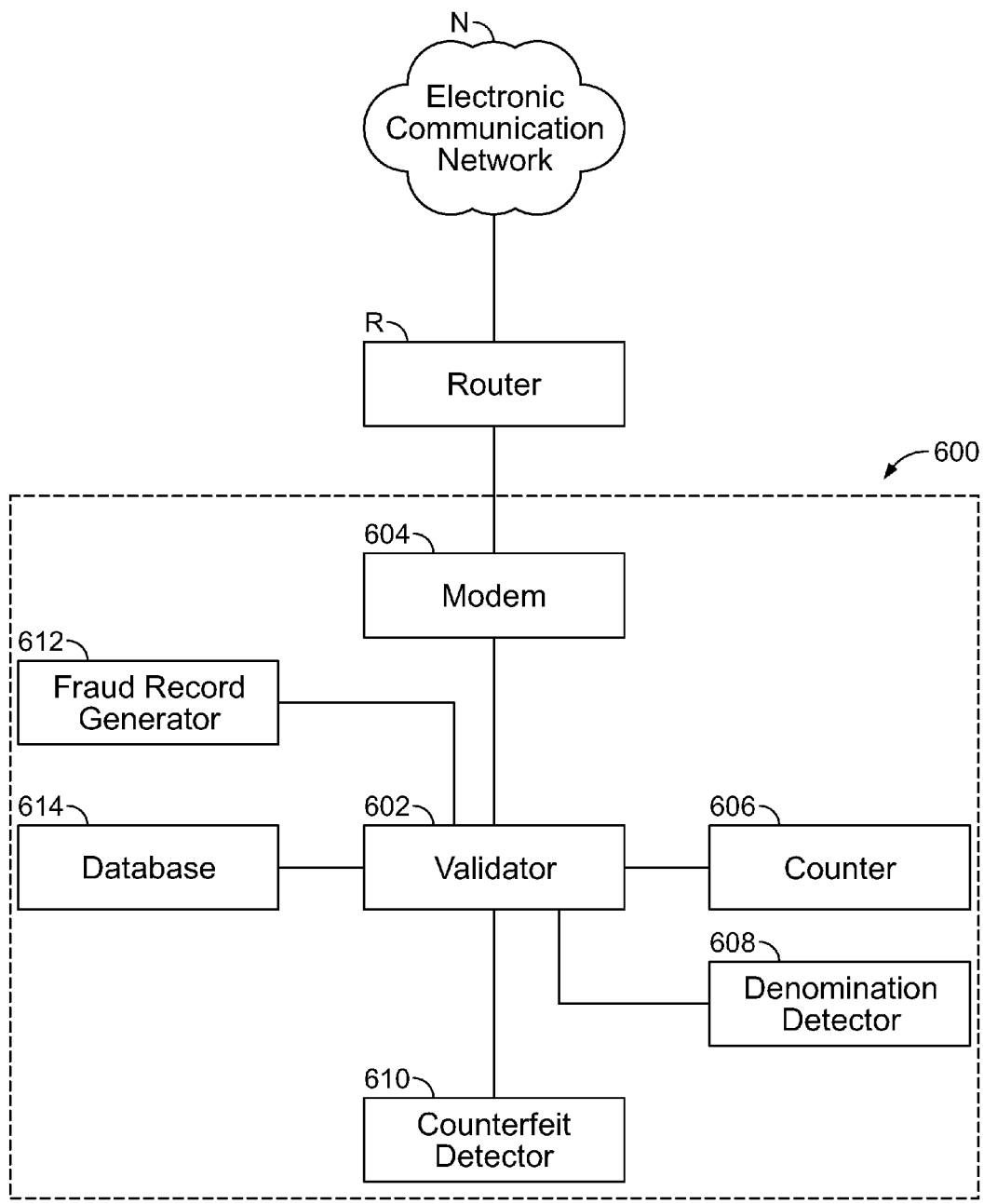
FIG. 6 shows an illustrative apparatus in accordance with principles of the invention.

FIG. 6 shows illustrative apparatus 600. Apparatus may include one or more features of apparatus 300 (shown in FIG. 3). Apparatus 100 (shown in FIG. 1) and apparatus 400 (shown in FIG. 4) may include one or more features of apparatus 600.

Apparatus 600 includes validator 602. Validator 602 may include one or more features of validators 318 or 320 (shown in FIG. 3) or validators 401 or 403 (shown in FIG. 4). Validator 602 may include one or more features of server 201 (shown in FIG. 2) or CPU 302 (shown in FIG. 3).

Apparatus 600 includes components of validator 602. Validator 602 may include counter 606. Counter 606 may detect a number of tangible items examined by validator 602. For example, the number of tangible items may be items retracted by an ATM dispenser. Counting the number of retracted items may allow an operator of the ATM to determine how many dispensed items may have been collected by an ATM customer.

Validator 602 may include denomination detector 608. Denomination detector 608 may determine a denomination of currency examined by validator 602. Denomination detector 608 may determine a denomination of foreign currencies. Based on the denomination of one or more retracted items, an ATM operator may determine a value of cash retracted by the ATM. Based on the denomination of one or more retracted items, an ATM operator may determine a value of cash dispensed by the ATM.

For example, a cash cassette may be labeled as including only twenty-dollar bills. However, the cash cassette may erroneously include one or more ten-dollar bills. Prior to dispensing cash to an ATM user, denomination detector 608 may determine whether a bill retrieved from the cash cassette is a twenty-dollar bill. If denomination detector 608 detects a presence of currency denominations other than twenty-dollars, replacement currency may be retrieved from the cash cassette. Retrieving replacement currency prior to dispensing the cash may reduce dissatisfaction of an ATM customer resulting from a mis-dispensing of currency.

Based on a determination by denomination detector 608, an ATM operator may inform an entity responsible for loading the cash cassette that the cash cassette did not include exclusively twenty-dollar bills. The ATM operator may request a refund of a difference between the expected value of cash in the cassette and the actual value of cash in the cassette.

Validator 602 includes counterfeit detector 610. Counterfeit detector 610 may determine if currency being examined by validator 602 is genuine. Security features associated with currency may be stored in database 614. Database 614 may include one or more characteristics of database 211 (shown in FIG. 2). In some embodiments, currency security features may be stored at a location remote from apparatus 600. Validator 602 may access the remote database using modem 604, router R and electronic communication network N.

Validator 602 may include fraud record generator 612. Data from counter 606, denomination detector 608 and counterfeit detector 610 may be transmitted to fraud record generator 612. Fraud record generator 612 may obtain data from remote sources such as network N. Fraud record generator 612 may transmit data obtained from validator components onto network N. Fraud record generator 612 may transmit data to a customer or a fraud investigation unit of a financial entity.

Fraud record generator 612 may transmit a look-up request to a database, such as database 614. Database 614 may store records of actions performed by a self-service device. The records may include a time and date stamp, account numbers, method of access or any suitable information generates by a self-service device such as an ATM.

Fraud record generator 612 may submit a query to database 614 requesting one or more records of actions taken a self-service device within a period of time. The period of time may include a first period prior to a dispensing of cash and a second period of time following the dispensing of cash. Fraud record generator 612 may include results of the query in a fraud record. The fraud record may include one or more accounts associated with the actions performed by the self-service device.

For example, an ATM customer may access the ATM by entering authentication credentials by swiping a bank card and entering a PIN number. Based on the entered credentials, the ATM may identify one or more bank accounts associated with the customer. The ATM may allow the customer to conduct one or more transactions based on a balance of funds in the one or more bank accounts. Each of the transactions conducted by the customer may be included in a fraud record produced by fraud record generator 612.

In some embodiments, fraud record generator 612 may generate a fraud record in response to a specific action performed by the ATM. For example, a fraud record may be generated in response to a request for a withdrawal of funds, in response to a retraction of cash by the ATM or in response to a deposit of a tangible item. In some embodiments, fraud record generator 612 may generate a fraud record in response to a request received via network N.

Figure 7:
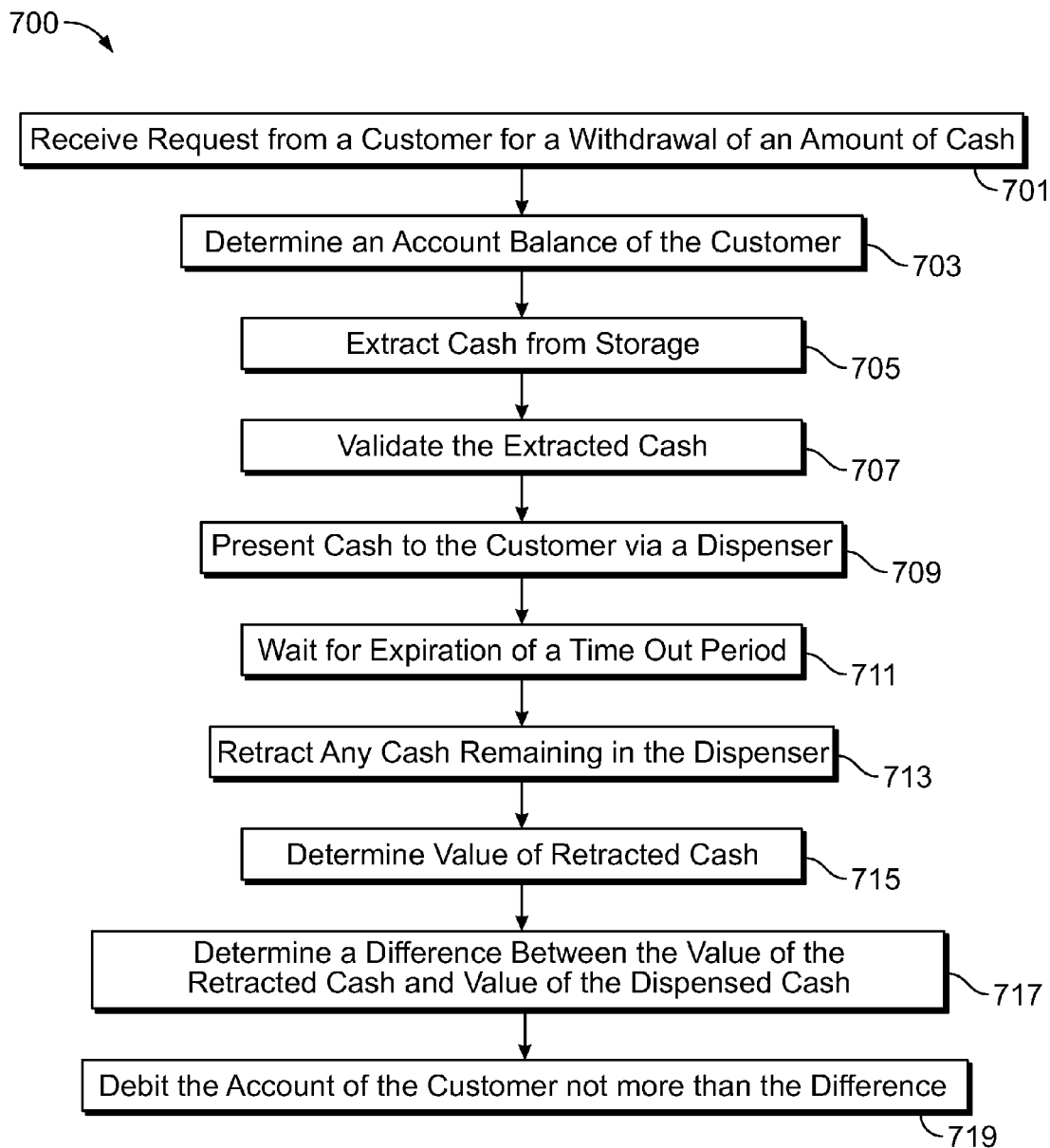
FIG. 7 shows an illustrative process in accordance with principles of the invention.

FIG. 7 shows illustrative process 700. For the sake of illustration, the steps of the process illustrated in FIG. 7 will be described as being performed by a "system." The "system" may include one or more of the features of the apparatus or processes that are shown in FIGS. 1-6 and/or any other suitable device or approach.

The "system" may be provided by an entity. The entity may be an individual, an organization or any other suitable entity.

At step 701, the system receives request from a customer for a withdrawal of an amount of cash. The customer may submit the request using an ATM. At step 703, the system determines an account balance of the customer. Prior to dispensing cash, the system may determine if the customer has an account balance sufficient to cover the request withdrawal amount.

At step 705, the system extracts cash from storage. The cash may be stored in a cash cassette, such as cash cassette 316 (shown in FIG. 3) or cash cassette 409 (shown in FIG. 4). At step 707, the system validates the extracted cash. Validating the extracted cash may include applying one or more examination routines, such as the routines shown in FIG. 5. The validating may include determining a value of the cash extracted from storage.

At step 709, the system presents cash to the customer via a dispenser, such as dispenser 110 (shown in FIG. 1). At step 711, the system waits for expiration of a time-out period. The time-out period may provide the customer sufficient time to become cognizant of the cash having been dispensed and to collect the dispensed cash.

After expiration of the time out period, at step 713, the system retracts any cash remaining in the dispenser. At step 715, the system determines a value of the retracted cash. At step 717, the system determines a difference between the value of the retracted cash and the value of the dispensed cash. Based on the difference, the system may determine an amount of cash collected by the customer. At step 719, the system debits the account of the customer not more than the difference. If the customer later contests the debited amount, the system may produce a record, such as a fraud record. The fraud record may show one or more details associated with the retraction. The fraud record may be generated by a fraud record generator, such as fraud record generator 612 (shown in FIG. 6).

For example, the fraud record may include a "trace" of actions performed by the system. The trace may show that the customer initiated a request for withdrawal of an amount of cash received at a particular date/time/location. The trace may show the value of cash dispensed and denomination of each bill dispensed. The trace may include the value of cash retracted and denomination of each bill retracted. The trace may include error logs corresponding to one or more components of a self-service device. The trace may include any suitable information.

FIG. 8 shows illustrative information 800. Information 800 may be collated into a fraud record. The fraud record may include transaction details associated with a SSK session. The SSK may relate one or more actions performed by the SSK. The one or more actions may each be associated with a customer or a set of customer credentials.

The fraud record may list one or more transactions conducted during the SSK session. The fraud record may include transaction details determined by a validator. Based on the fraud record, an entity may be prepared to respond to mis-dispense claims associated with one or more actions performed by the SSK during a SSK session.

The fraud record may show a relationship between two or more transactions. For example, information 800 shows that a dispensing and a retracting are temporally related based on a difference in time between the dispensing and the retracting. Information 800 also shows that the dispensing and the retracting occurred during one "session ID."

Figure 9:
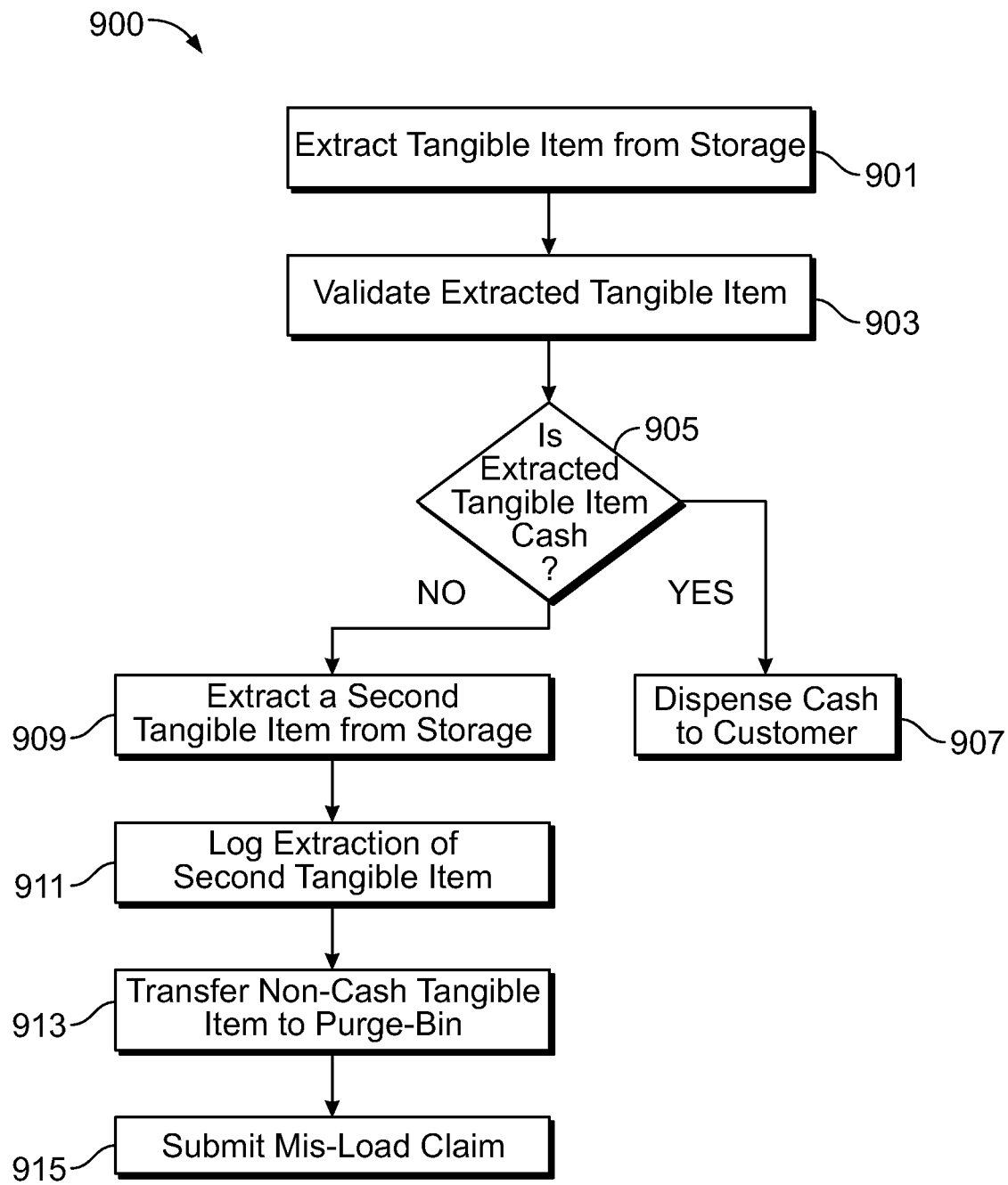
FIG. 9 shows an illustrative process in accordance with principles of the invention.

FIG. 9 shows illustrative process 900. For the sake of illustration, the steps of the process illustrated in FIG. 9 will be described as being performed by a "system." The "system" may include one or more of the features of the information and/or apparatus that are shown in FIGS. 1-4, 6, 8 and/or any other suitable device, information or approach.

The "system" may utilize one or more of the features of the processes shown in FIGS. 5, 7 and/or any other suitable approach.

The "system" may be provided by an entity. The entity may be an individual, an organization or any other suitable entity.

At step 901, the system extracts a tangible item from storage. At step 903, the system validates the extracted tangible item. Validating the tangible item may include applying one or more of examination routines 500, 502 or 504 (shown in FIG. 5). At step 905, the system may determine if the tangible item is or is not cash.

If the extracted tangible item is not cash, then, at step 909, the system extracts a second tangible item from a storage compartment. The storage compartment may be a storage cassette holding one or more tangible items. The storage compartment may be a cash cassette. At step 911 the system logs the substitution of the second tangible item for the first non-cash item. At step 913, the system transfers non-cash item to a purge bin. The purge-bin may be removed from the system and the non-cash item may be examined. At step 915, the system submits a mis-load claim. The mis-load claim may be submitted to an entity responsible for loading cash into the storage compartment.

If the extracted item is cash, then at step 907, the system may dispense the cash retrieved from storage to the customer.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for a dual validator self-service kiosk have been provided. Persons skilled in the art will appreciate that the present invention can be practiced by other than the described embodiments, which are presented for purposes of illustration rather than of limitation. The present invention is limited only by the claims that follow.

What is claimed is:

1. A self-service kiosk comprising:
   a dispenser configured to:
      dispense a first tangible item to a customer; and
      retract the first tangible item into the kiosk if the first tangible item remains uncollected for a period of time;
   a first validator configured to examine the first tangible item:
      before the first tangible item is dispensed by the dispenser; and
      after the first tangible item is retracted by the dispenser;
   a bi-directional flow path coupling the first validator to the dispenser, wherein the bi-directional flow path is configured to transfer the first tangible item from the first validator to the dispenser and from the dispenser to the first validator;
   an acceptor configured to receive a second tangible item from the customer;
   a second validator coupled to the acceptor, the second validator configured to examine the second tangible item received by the acceptor; and
   a purge-bin flow path coupling the second validator to a purge-bin, wherein the purge-bin flow path is configured to transfer the second tangible item from the second validator to the purge-bin.

2. The kiosk of claim 1, the first tangible item being one of a plurality of first tangible items, the first validator comprising:
   a counter configured to count each of the plurality of first tangible items;
   a denomination detector configured to identify a denomination of each of the plurality of first tangible items; and
   a counterfeit detector configured to identify non-currency items among the plurality of first tangible items.

3. The kiosk of claim 1 wherein:
   the first validator is configured to:
      apply a first examination routine to the first tangible item prior to dispensing the first tangible item to the customer; and
      apply a second examination routine to the first tangible item after retracting the first tangible item; and
   the second validator is configured to apply a third examination routine to the second tangible item.

4. The kiosk of claim 1 further comprising a cassette configured to hold a plurality of first tangible items, the cassette being coupled to the first validator.

5. The kiosk of claim 4 wherein the first validator is configured to examine each of the first tangible items extracted from the cassette.

6. The kiosk of claim 1 wherein the purge-bin flow path is a first purge-bin flow path, the kiosk further comprising a second purge-bin flow path that is configured to transfer the first tangible item after being retracted into the kiosk from the first validator to the purge-bin.

7. The kiosk of claim 1 wherein the first tangible item is not money.

8. An automated teller machine ("ATM"), the ATM comprising:
   a storage cassette configured to store a first tangible item;
   a first validator configured to:
      receive the first tangible item from the storage cassette; and
      apply an examination routine to the first tangible item, the examination routine comprising:
         identifying the first tangible item as currency;
         validating an authenticity of the first tangible item; and
         determining a denomination of the first tangible item;
   a dispenser configured to receive the first tangible item from the first validator and present the first tangible item to a customer;
   a bi-directional transfer path configured to transfer the first tangible item from the first validator to the dispenser and from the dispenser to the first validator;
   an acceptor configured to receive a second tangible item from the customer;
   a second validator coupled to the acceptor, the second validator configured to examine the second tangible item received from the customer;
   a purge-bin transfer path coupling the second validator to a purge-bin, wherein the purge-bin transfer path is configured to transfer the second tangible item from the second validator to the purge-bin; and
   a computer system comprising:

a non-transitory computer readable medium having computer readable program code embodied therein; and
a processor configured to execute the computer readable program code;
wherein the computer readable program code in said computer system when executed by the processor causes the computer system to control;
a first transfer of the first tangible item from the storage cassette to the first validator;
a second transfer of the first tangible item from the first validator to the dispenser via the bi-directional transfer path; and
a third transfer of the second tangible item from the second validator to the purge-bin via the purge-bin transfer path.

9. The ATM of claim 8 wherein:
the dispenser is configured to retract the first tangible item after a time-out period; and
the first validator is configured to determine a denomination of the currency after the time-out period.

10. The ATM of claim 8 wherein, when the first tangible item is one of a plurality of tangible items:
the first validator is configured to:
apply a first examination routine to each of the plurality of tangible items;
the dispenser is configured to:
present each of the plurality of tangible items to the customer; and
retract at least a portion of the plurality of tangible items;
the first validator is configured to receive the retracted portion of the plurality of tangible items via the bi-directional transfer path and apply a second examination routine to the retracted portion of the plurality of tangible items; and
the computer readable program code in said computer system when executed by the processor causes the computer system to:
calculate a first value ("FV") corresponding to the dispensed plurality of tangible items;
determine a second value ("SV") corresponding to the retracted portion of the plurality of tangible items;
calculate a difference equal to (FV)–(SV); and
debit an account of the customer an amount equal to the difference.

11. The ATM of claim 10, wherein the second examination routine comprises:
counting each tangible item in the retracted portion of the plurality of tangible items; and
determining a denomination of each tangible time in the retracted portion of tangible items.

12. The ATM of claim 8, wherein, if the first validator identifies the first tangible item as a non-currency item, the computer readable program code in said computer system when executed by the processor causes the computer system to:
control:
a fourth transfer of the non-currency item from the first validator to the purge-bin; and
a fifth transfer of a replacement for the non-currency item from the storage cassette to the first validator; and
log:
a date and time of the identifying; and
a denomination of the replacement.

13. The ATM of claim 12, wherein the computer readable program code in said computer system when executed by the processor causes the computer system to submit a mis-loaded cassette claim to an entity responsible for loading the cash cassette.

14. The ATM of claim 8 wherein, if the denomination is not associated with the storage cassette, the computer readable program code in said computer system when executed by the processor causes the computer system to, control a fourth transfer of the first tangible item to the purge-bin.

15. The ATM of claim 14 wherein, the computer readable program code in said computer system when executed by the processor causes the computer system to submit a mis-loaded cassette claim to an entity responsible for loading the cash cassette.

16. An automated teller machine ("ATM") comprising a first validator, a second validator and a purge-bin, the ATM configured to:
receive a deposit;
transfer the deposit to the first validator;
transfer the deposit from the first validator to the purge-bin;
receive a request for a withdrawal of cash;
in response to receiving the request:
extract the cash from a cash cassette;
transfer the cash to the second validator;
transfer the cash from the second validator to a dispenser using a bi-directional transfer path;
dispense the cash to the customer;
retract, after a time-out period, at least a portion of the cash not collected by the customer;
transfer the retracted portion of the cash from the dispenser to the second validator using the bi-directional transfer path;
wherein:
the first validator is configured to examine the deposit; and
the second validator is configured to examine:
the cash prior to dispensing the cash to a customer; and
the retracted portion of the cash.

17. The ATM of claim 16, the ATM further configured to debit an account of the customer an amount corresponding to a difference between:
a first value of the cash extracted from the cash cassette; and
a second value of the retracted portion of the cash not collected by the customer.

18. The ATM of claim 17, the ATM further configured to, in response to a detection of the difference:
generate a fraud record, the fraud record comprising:
a date and time of the request;
an action performed by the ATM in response to the request;
the first value;
the second value; and
the difference between the first value and the second value; and
transmit the fraud record.

19. The ATM of claim 16, wherein, when the cash is a first batch of cash, the ATM is configured to:
transfer the first batch of cash to the second validator; and
if the second validator identifies a non-currency item included in the first batch of cash:
extract a second batch of cash from the cash cassette;
transfer the first batch of cash from the second validator to the purge bin; and transfer the second batch of cash to the second validator.

\* \* \* \* \*